United States Patent [19]

Ohta et al.

[11] Patent Number: 5,095,350

[45] Date of Patent: Mar. 10, 1992

[54] MAGNETO-OPTIC MEMORY MEDIUM

[75] Inventors: Kenji Ohta; Akira Takahashi; Hiroyuki Katayama, all of Nara; Tomokazu Ise, Abiko; Tomoyuki Miyake, Tenri; Junichiro Nakayama, Nara, all of Japan

[73] Assignee: Sharp Kabushiki Kaisha, Osaka, Japan

[21] Appl. No.: 505,476

[22] Filed: Apr. 6, 1990

[30] Foreign Application Priority Data

Apr. 7, 1989 [JP] Japan ................. 1-89318

[51] Int. Cl.$^5$ ............... H01L 27/22; G11C 13/06; G11B 5/74; B32B 15/00
[52] U.S. Cl. ...................... 357/27; 365/122; 428/668; 428/432; 428/928; 360/131; 357/25
[58] Field of Search ........... 365/122, 168, 135; 360/131, 135; 428/668, 928

[56]  References Cited

U.S. PATENT DOCUMENTS

| 4,390,600 | 6/1983 | Ohta et al. | 428/621 |
| 4,414,650 | 11/1983 | Ohta et al. | 365/122 |
| 4,489,139 | 12/1984 | Ohta et al. | 428/621 |
| 4,695,514 | 9/1987 | Takahashi et al. | 428/432 |
| 4,737,947 | 4/1988 | Osato et al. | 365/122 |
| 4,780,377 | 10/1988 | Takano | 365/122 |
| 4,789,606 | 12/1988 | Yamada et al. | 428/928 |
| 4,842,956 | 6/1989 | Kobayashi | 428/668 |
| 4,876,159 | 10/1989 | Shin | 428/928 |
| 4,894,097 | 1/1990 | Iijima et al. | 148/101 |
| 4,922,454 | 5/1990 | Taki | 365/122 |
| 4,943,957 | 7/1990 | Sato et al. | |

FOREIGN PATENT DOCUMENTS

| 0184034 | 6/1986 | European Pat. Off. . |
| 63-122036 | 5/1963 | Japan . |
| 57-12428 | 1/1982 | Japan . |
| 60-117436 | 6/1985 | Japan . |
| 60-162750 | 8/1985 | Japan . |
| 63-18544 | 1/1988 | Japan . |
| 63-117355 | 5/1988 | Japan . |

OTHER PUBLICATIONS

Japanese Journal of Applied Physics, vol. 20, No. 11, Nov. 1981, pp. 2089-2095; "Magnetization Process of . . .".

Primary Examiner—Rolf Hille
Assistant Examiner—Mahshid Saadat
Attorney, Agent, or Firm—Birch, Stewart, Kolasch & Birch

[57]  ABSTRACT

A magneto-optic memory medium of an exchange-coupled ferrimagnetic double-layered structure having a recording film of a specific amorphous GdTbFe alloy and a reading film of a specific amorphous GdNdFe alloy.

14 Claims, 9 Drawing Sheets

MAGNETO-OPTIC MEMORY MEDIUM

BACKGROUND OF THE INVENTION

1. Field of the Invention

The present invention relates to a magneto-optic memory medium. More specifically, it relates to a magneto-optic memory medium having an exchange-coupled ferrimagnetic double-layered structure in which a recording film and a reading film are laminated.

2. Description of the Prior Art

A thin film of amorphous rare earth-transition metal alloy (hereinafter abbreviated as RE-TM film) has been used as a memory medium in a magneto-optic disc device since it has suitable characteristics for magneto-optic recording (as disclosed in Japanese Published Unexamined Patent Applications SHO 60-11746/1985 and SHO 57-12428/1982, and U.S. Pat. Nos. 4,390,600, 4414650, and 4489139). RE-TM films disclosed in the above applications are known in that they sufficiently exhibit recording sensitivity and recording density. However, these RE-TM films exhibit a poorer S/N ratio when reading (reproducing) than optical recording materials put into practice as a Read-Only type or Write-Once type.

Reading capability of a magneto-optic memory medium depends greatly upon magneto-optic effects, specifically upon a Kerr rotation angle and Faraday rotation angle. In order to enhance the magneto-optic effects of the RE-TM film, attempts have so far been made to add Bi, Sn, or like elements thereto. In this regard, an exchange-coupled ferrimagnetic double-layered structure for improving the reading capability of the magneto-optic memory medium is known, the structure having a reading film made of a material exhibiting a greater magneto-optic effect and a recording film made of a material suitable for retaining recorded information. See "Magnetization Process of Exchange-Coupled Ferrimagnetic Double-Layered Films", Japanese Journal of Applied Physics Vol. 20, No. 11, November, 1981 pp. 2089-2095.

The recording film in such a double-layered structure requires appropriate Curie temperature for recording and also a high coercive force. On the other hand, the reading film requires the above-mentioned magneto-optic effects. Japanese Published Unexamined Patent Application SHO 63-18544, for example, discloses such an exchange-coupled ferrimagnetic double-layered structure. In this case, TbFeM (M is Cr or Al) is used for the recording film, and GdFeCo for the reading film.

Generally, the greater the magneto-optic effects, i.e., the Kerr rotation angle or Faraday rotation angle increase, the more the reading capability improves. The magneto-optic effects depend generally upon a wavelength of an applied laser beam. However, in the medium of the above-mentioned conventional exchange-coupled ferrimagnetic double-layered structure, the magneto-optic effects decrease with respect to the applied laser beam of a short-wavelength area thereby decreasing the Kerr rotation angle or Faraday rotation angle, resulting in a poor S/N.

Also, there are limitations with regard to improving the recording medium in recording density using a laser beam of a short-wavelength type. Therefore, the wavelength of a laser beam to be used in recording/reproducing is restricted. This causes restrictive materials to be used for the recording medium and unsuitableness of the medium for general purpose.

In short, the conventional magneto-optic memory medium of the exchange-coupled ferrimagnetic double-layered structure has disadvantages in that the reproducing capability is poor with respect to a short-wavelength laser beam and improvement in the recording capacity using a short wavelength laser beam is limited.

SUMMARY OF THE INVENTION

Thus, according to the present invention, there is provided a magneto-optic memory medium comprising a laminate of a recording film made of an amorphous rare earth-transition metal alloy having a high coercive force and a reading film made of an amorphous rare earth-transition metal alloy exhibiting high magneto-optic effects;

said recording film being made of an amorphous alloy represented by the formula:

$(Gd_p Tb_{1-p})_q Fe_{1-q}$ wherein p and q satisfy $0.1 < q < 0.35$, $0 < p \times q < 0.25$, and $0 < (1-p) \times q < 0.25$; and said reading film being made of an amorphous alloy represented by the formula:

$Gd_x Nd_y Fe_{1-x-y}$ wherein x and y satisfy $0.1 < x < 0.3$, and $0 < y < 0.25$.

By way of the above construction of the invention, information is recorded in the GdTbFe recording film, while the recorded information is reproduced by means of the GdNdFe reading film.

Here, when a laser beam is applied from the GdNdFe-film side, a quantum-mechanical exchange-coupled action between the GdTbFe recording film and the GdNdFe reading film causes an exchange-coupled magnetic field to be applied from the former to the latter. By virtue of this, the coercive force of the GdNdFe reading film grows stronger, so that the recorded information can be stably retained.

Thus, the recording capability, particularly that with respect to a short-wavelength laser beam (typically 600 nm or less), and the reproducing capability can be greatly improved.

DETAILED DESCRIPTION OF THE PREFERRED EMBODIMENTS

The magneto-optic memory medium of the present invention comprises of a specified recording film and a specified reading film which are laminated over an appropriate substrate. Usually and suitably, the above reading film and recording film are laminated in this order over a transparent substrate via a first dielectric film made of SiN, AlN, ZnS, $SiO_2$, SiAlON, AlNGe, or the like, and further, the recording film is covered with a second dielectric film.

In the present invention, the recording film is made of an amorphous GdTbFe alloy of a specific composition, the reading film being made of an amorphous GdNdFe alloy of a specific composition. These amorphous alloy films can be formed by sputtering or vapor deposition, for example, by sputtering using as a target an alloy of the specific composition or that using a composite target, or by multi-source covapor deposition. A thickness of each of the recording and reading films is desirably 500 nm or less, preferably 10 to 100 nm in view of the extent to which the exchange-coupled action exerts and the recording sensitivity.

Hereinafter, an embodiment of the invention will be described in conjunction with drawings: FIGS. 1 to 18.

Figure 1:
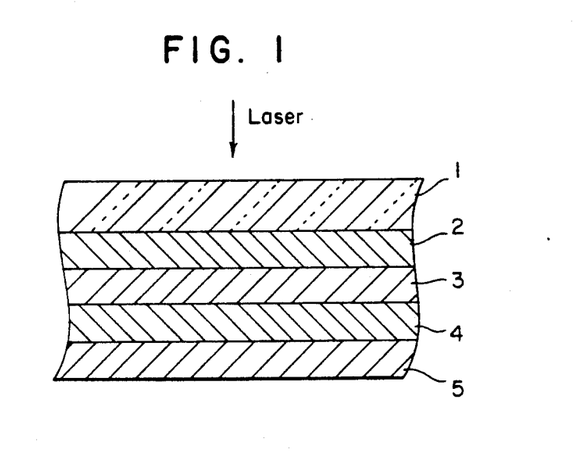
FIG. 1 is a fragmentary sectional view of an embodiment according to the invention.

As shown in FIG. 1, a magneto-optic memory medium according to the invention is made up of a substrate 1, a first nitride film 2, a GdNdFe reading film 3, a GdTbFe recording film 4, and a second nitride film 5, which are sequentially placed from a laser beam applying side.

For the substrate 1, a transparent substrate made of, for example, polycarbonate or glass can be used. The substrate 1 permits a laser beam to irradiate the GdNdFe reading film 3 and the GdTbFe recording film 4, and supports the films, the first nitride film 2 to the second nitride film 5. For the nitride film 2, such a dielectric film, for example, SiN or AlN of 80 to 100 nm thick is used as to enlarge Kerr rotation angle by magneto-optic effects, resulting in higher reading capability.

Description will hereinafter be made on characteristics of each of the reading and recording films. Such characteristics are evaluated with respect to GdNdFe films and GdTbFe films which are different in component ratio and formed on glass substrates, each of the films having 50 to 150 nm thick.

Figure 2:
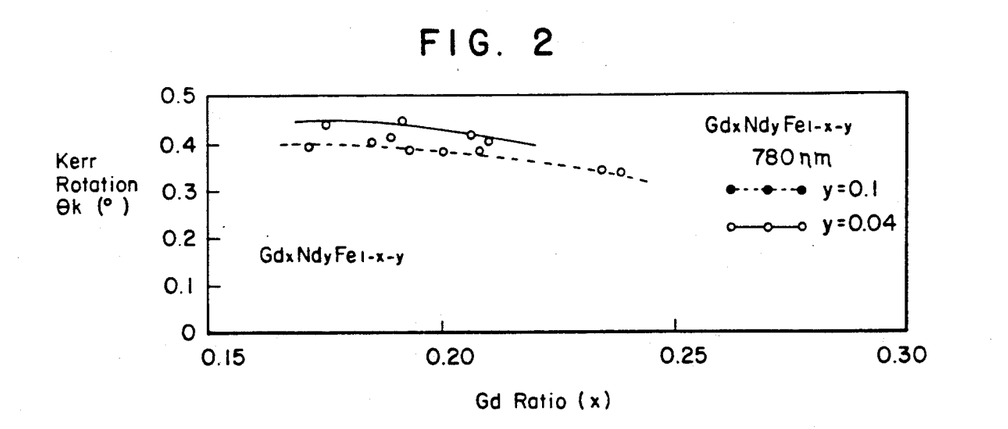
FIG. 2 is a view showing a relationship between component ratio and Kerr rotation angle of a GdNdFe film when a long-wavelength light source is used.

As shown in FIG. 2, when GdNdFe wherein a component ratio of Gd represented by x is less than 0.2 is used for the GdNdFe reading film (hereinafter referred to as "reading film"), the Kerr rotation angle $\theta_k$ is approximately 0.4° in the case where a long-wavelength laser beam having a wavelength of 780 nm is used. The Kerr rotation angle 0.4° is comparatively large, so this film is suitable for the reading film. FIG. 2 shows the cases where component ratios of Nd represented by y are 0.1 and 0.04, respectively.

Figure 3:
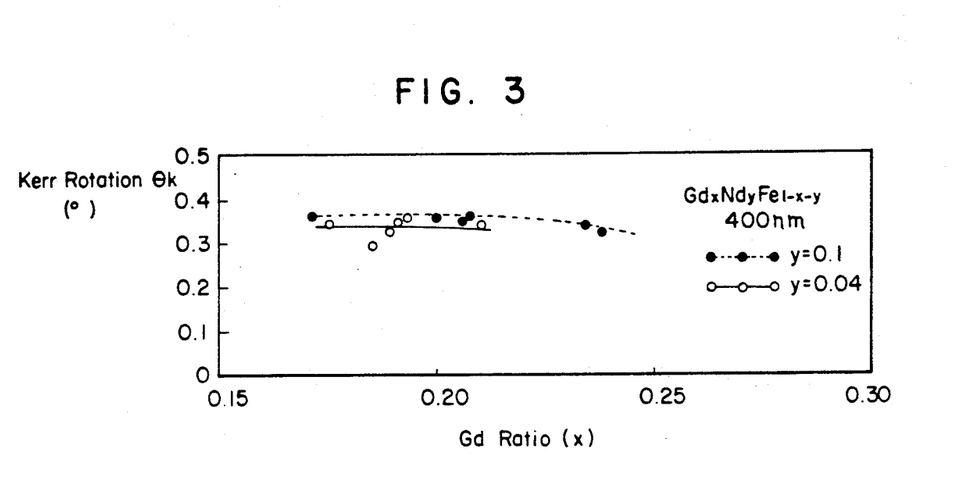
FIG. 3 is a view showing a relationship between component ratio and Kerr rotation angle of a GdNdFe film when a short-wavelength light source is used.
Figure 4:
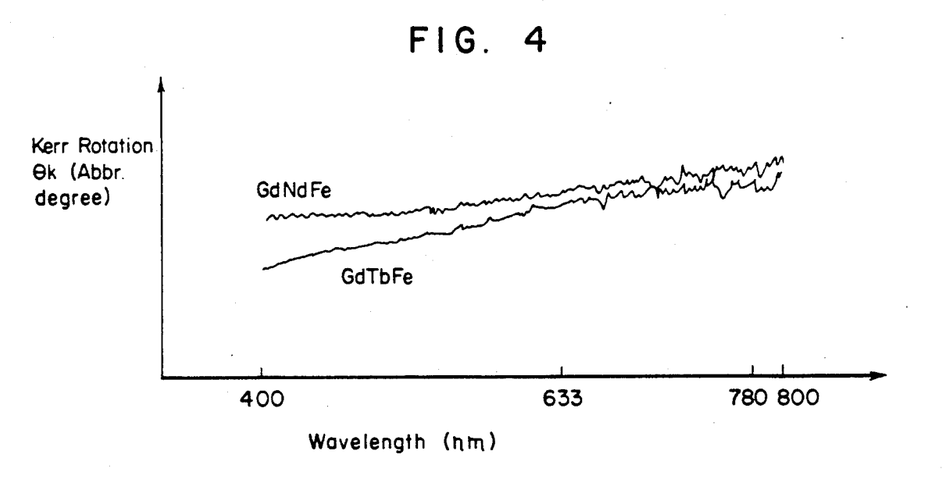
FIG. 4 is a view showing wavelength dependence of Kerr rotation angle of a GdNdFe film and GdTbFe film.

As well in the case where a short-wavelength laser beam having a wavelength of 400 nm is used, FIG. 3 apparently shows very slight decrease in Kerr rotation angle. Like FIG. 2, FIG. 3 shows the cases where component ratios of Nd represented by y are 0.1 and 0.04, respectively. Further, the Kerr rotation angle $\theta_k$ of GdNdFe scarcely depends on a wavelength of overall wavelength area of a visible light source, and is substantially constant (FIG. 4). In contrast, the Kerr rotation angle of GdTbFe tends to decrease with the decrease in wavelength in a short-wavelength area as shown in FIG. 4. On the other hand, temperature dependence of the Kerr rotation angle of the reading film does not vary with the variation in component ratio of the film.

As described above, when GdNdFe is used for the reading film, a short-wavelength laser beam can be effectively used so that decrease in beam diameter can be realized, resulting in a memory medium remarkably improved in recording density. As an instance, when a wavelength of the applied laser beam is reduced by half using Second Harmonic Generator (S. H. G.), the recording density becomes 4 times greater.

Figure 5:
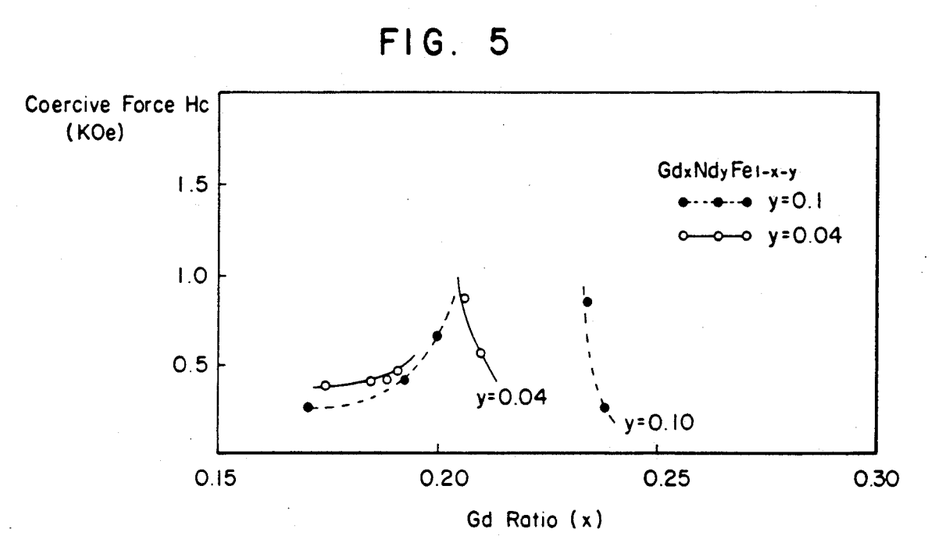
FIG. 5 is a view showing a relationship between component ratio and coercive force of a GdNdFe film.
Figure 6:
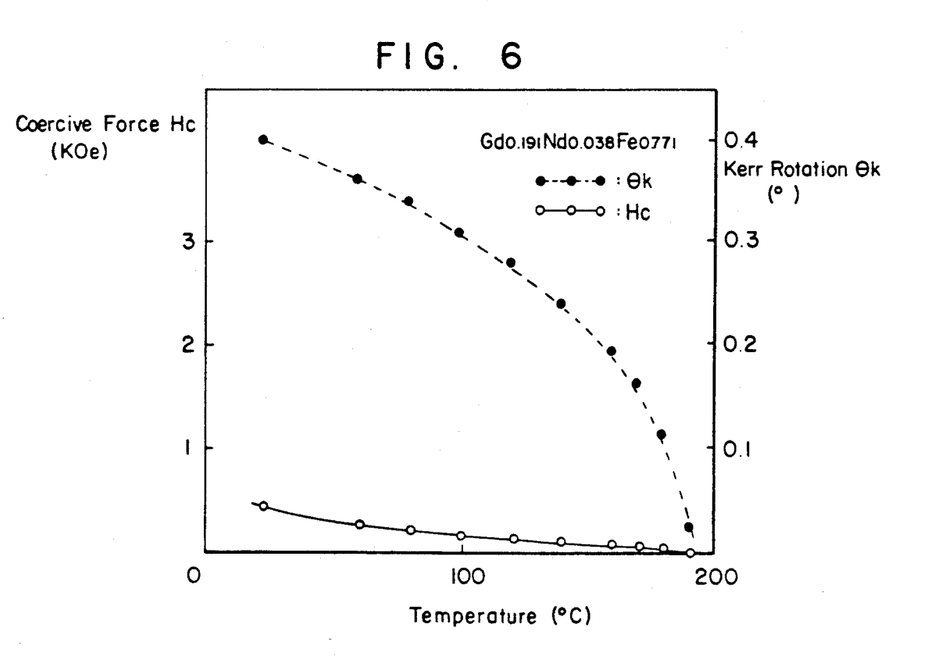
FIGS. 6 to 8 are views showing temperature dependence of coercive force and Kerr rotation angle in GdNdFe films different in component ratio.
Figure 7:
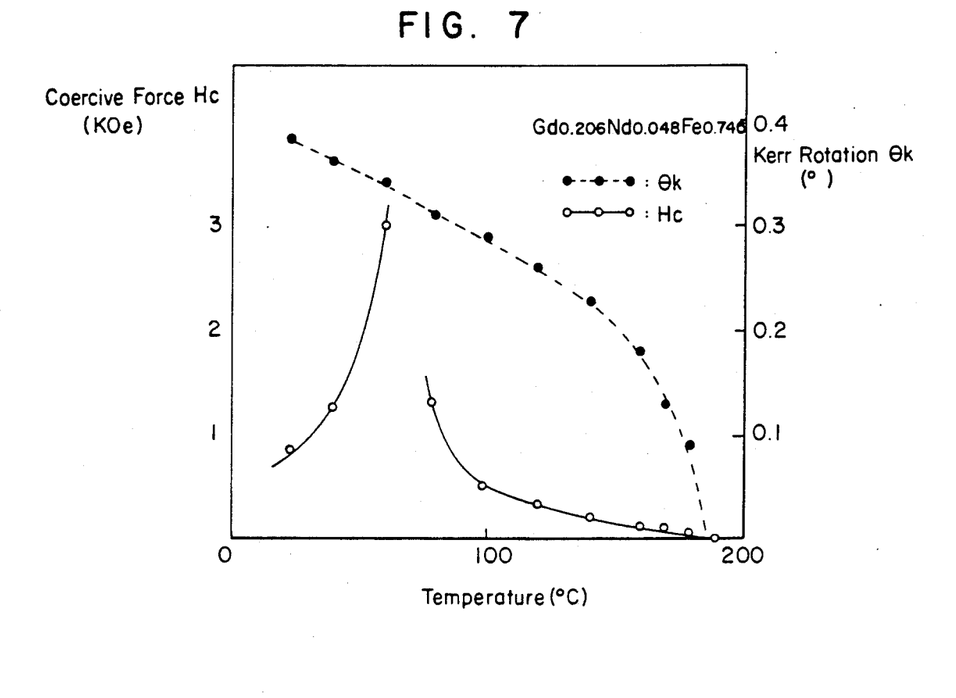
Figure 8:
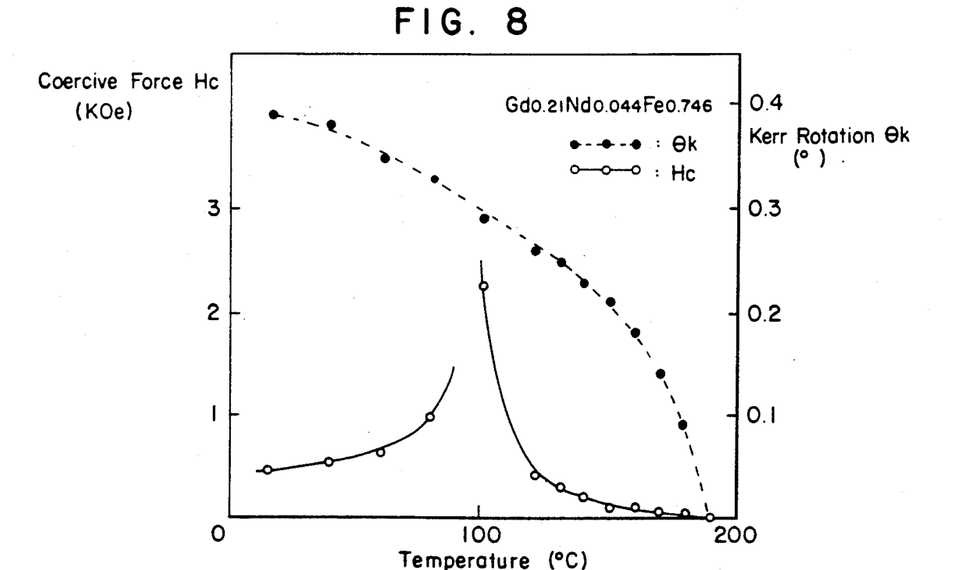

A coercive force of the reading film remains as small as approximately 1 kOe even if a component ratio of GdNdFe varies, as shown in FIG. 5 which refers the cases where component ratios of Nd represented by y are 0.1 and 0.04, respectively. As shown in FIGS. 6 to 8, temperature dependence of the coercive force of the reading film varies with the variation of component ratio thereof. In FIG. 7 ($Gd_{0.206}Nd_{0.048}Fe_{0.746}$) and FIG. 8 ($Gd_{0.21}Nd_{0.044}Fe_{0.746}$), compensation temperature is found within the tested temperature range for Curie temperature. On the other hand, in FIG. 6 ($Gd_{0.191}Nd_{0.038}Fe_{0.771}$), compensation temperature is not found within the tested temperature range, so the coercive force is generally small.

In the present invention, however, since the reading film 3 is exchange-coupled with the GdTbFe recording film 4 described below, the reading film 3 can sufficiently serve as a reading film even if the coercive force thereof is small by virtue of a quantum-mechanical exchange-coupled action.

With the help of the exchange-coupled action, the absolute value Hc of the apparent coercive force of the reading film 3 can be enhanced, the enhanced absolute value Hc being represented by the following equation:

$$H_c = \sigma w / (2 \times Ms \times h) \tag{1}$$

wherein $\sigma w$ represents domain wall energy density [$erg/cm^2$] at the interface of the double-layered films; Ms represents saturation magnetization [$emu/cm^3$]; and h represents a thickness of the reading film 3.

Figure 9:
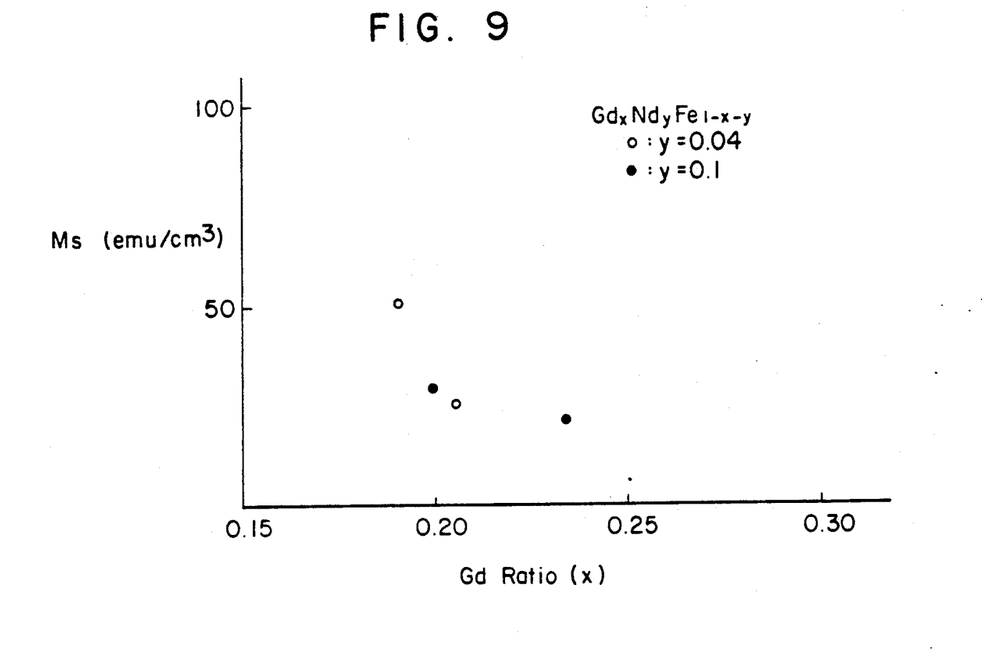
FIG. 9 is a view showing a relationship between component ratio of Gd and saturation magnetization of a GdNdFe film.

As an example, if a coercive force $H_c$ is calculated with the equation (1) wherein $\sigma w = 1$ $erg/cm^2$, h = 500 Å and Ms = 30 $emu/cm^3$ which is determined so as not to surpass 100 $emu/cm^3$ based on FIG. 9, $H_c$ is approximately 6.7 kOe. This value is strong enough to retain small information-written bits.

Figure 10:
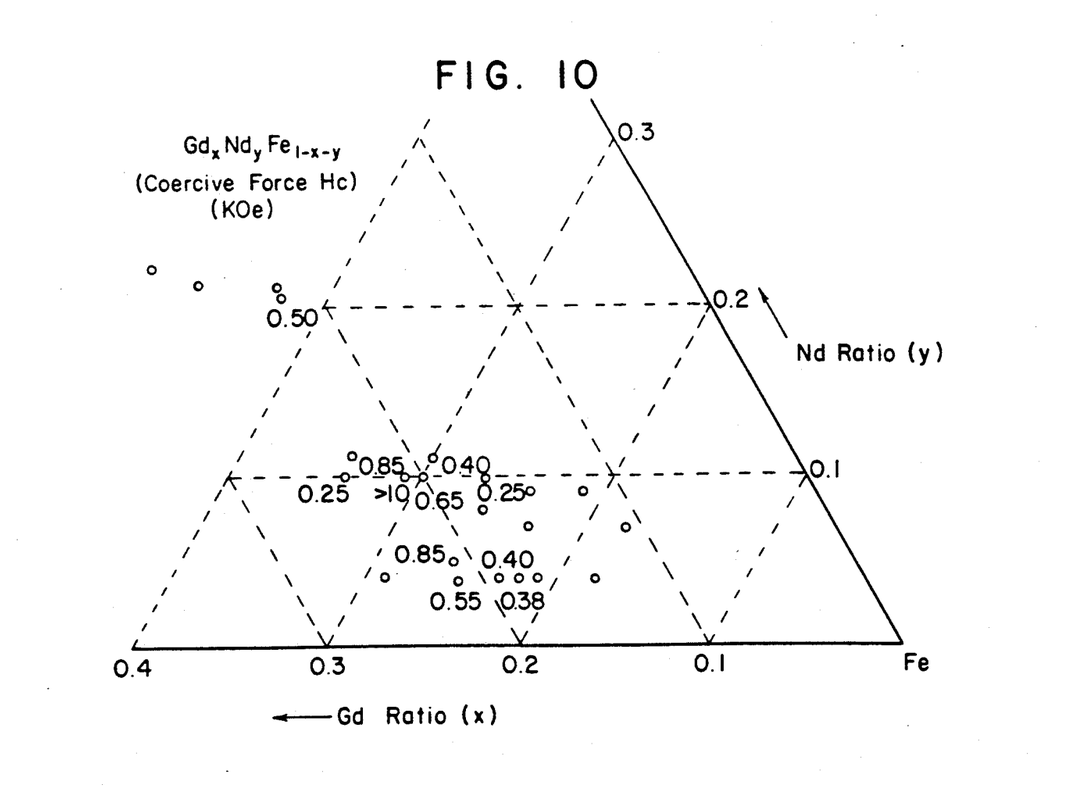
FIG. 10 is a view showing a relationship between component ratio and coercive force of a GdNdFe film.
Figure 11:
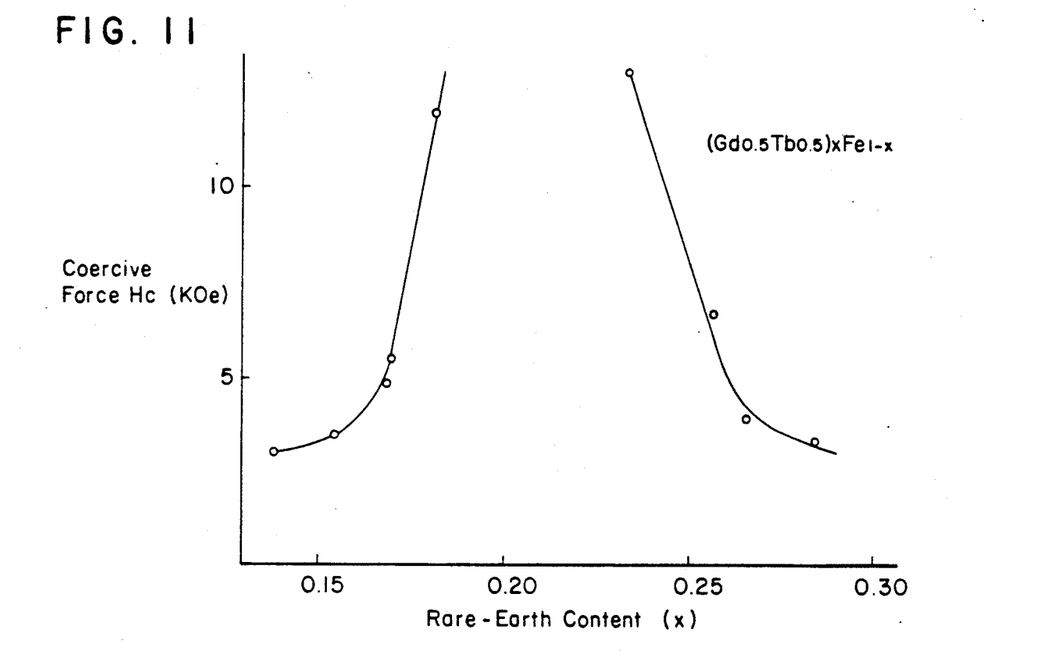
FIG. 11 is a view showing a relationship between component ratio and coercive force of a GdTbFe film.

Therefore from FIG. 10 in which values denote coercive forces, a component ratio of the reading film 3 is restricted to the range satisfying the following inequalities (2) and (3) at the same time, based on conditions where perpendicular magnetic anisotoropy is obtained.

$$0.1 < x < 0.3 \qquad (2)$$

$$0 < y < 0.25 \qquad (3)$$

wherein x represents a component ratio of Gd; and y represents a component ratio of Nd in $Gd_xNd_yFe_{1-x-y}$.

Figure 12:
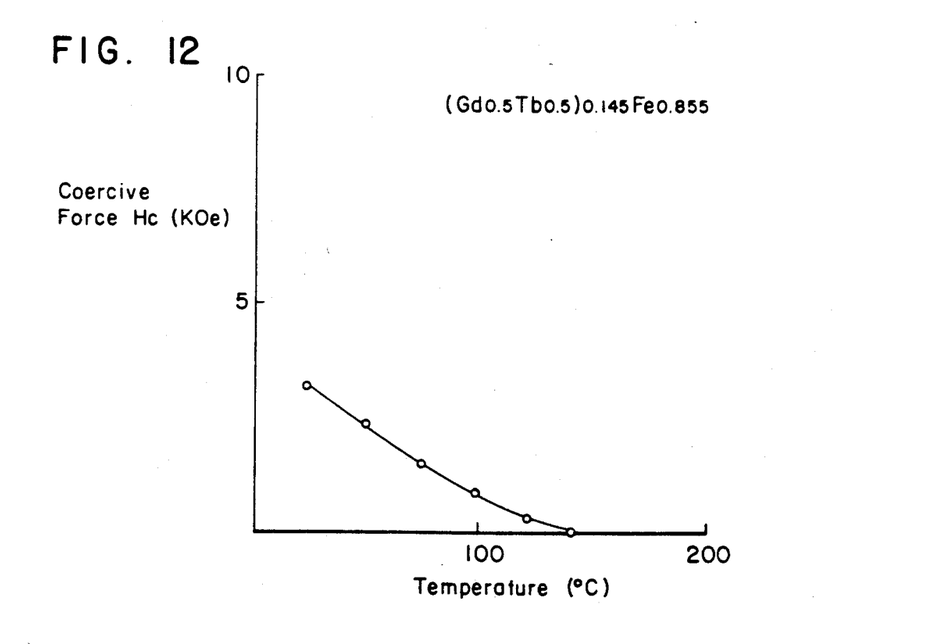
FIGS. 12 to 15 are views showing temperature dependence of coercive force of GdTbFe films different in component ratio.
Figure 13:
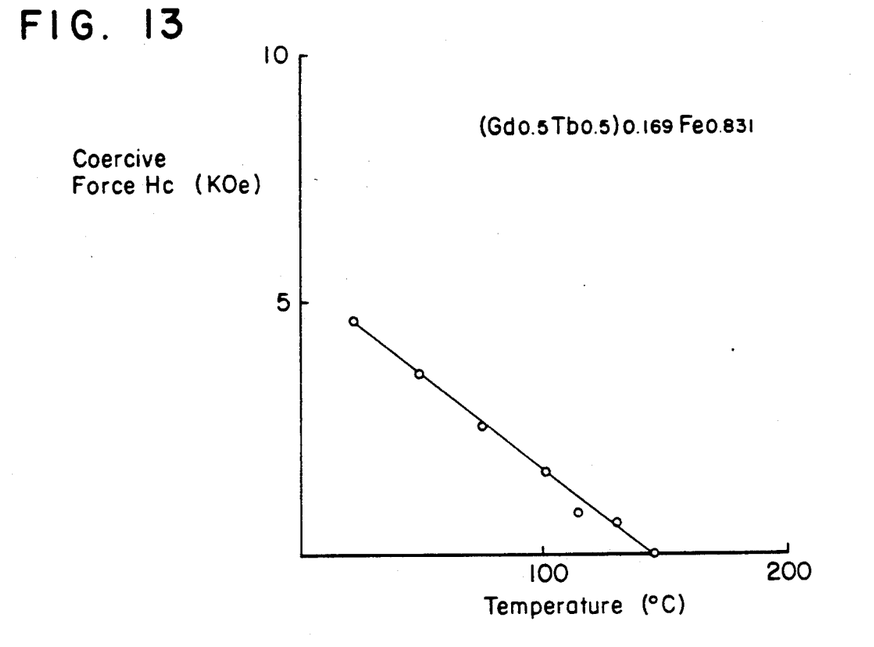
Figure 14:
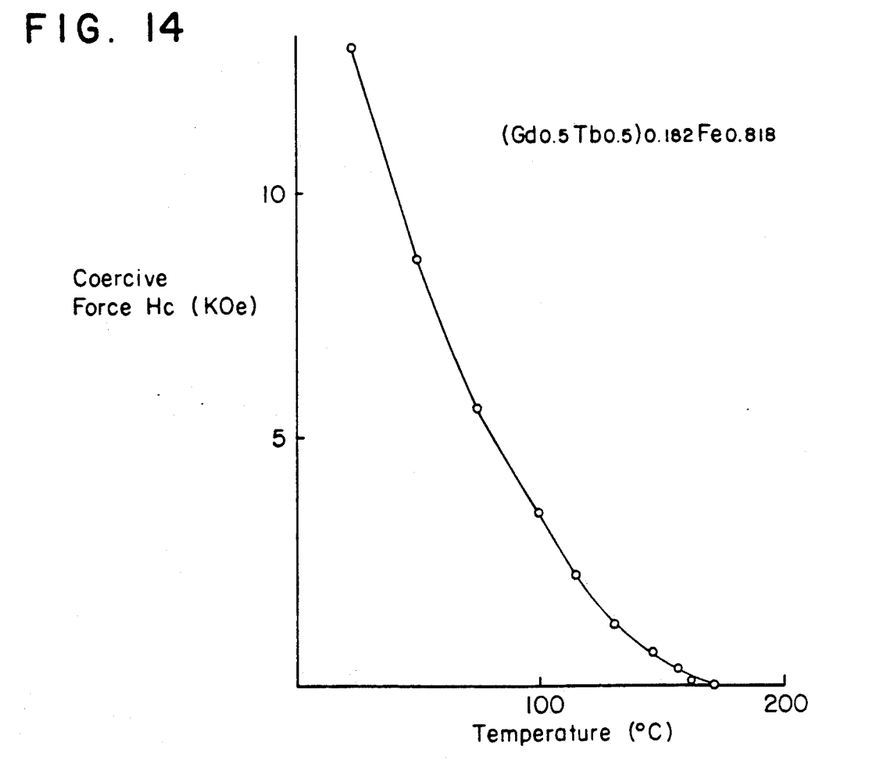
Figure 15:
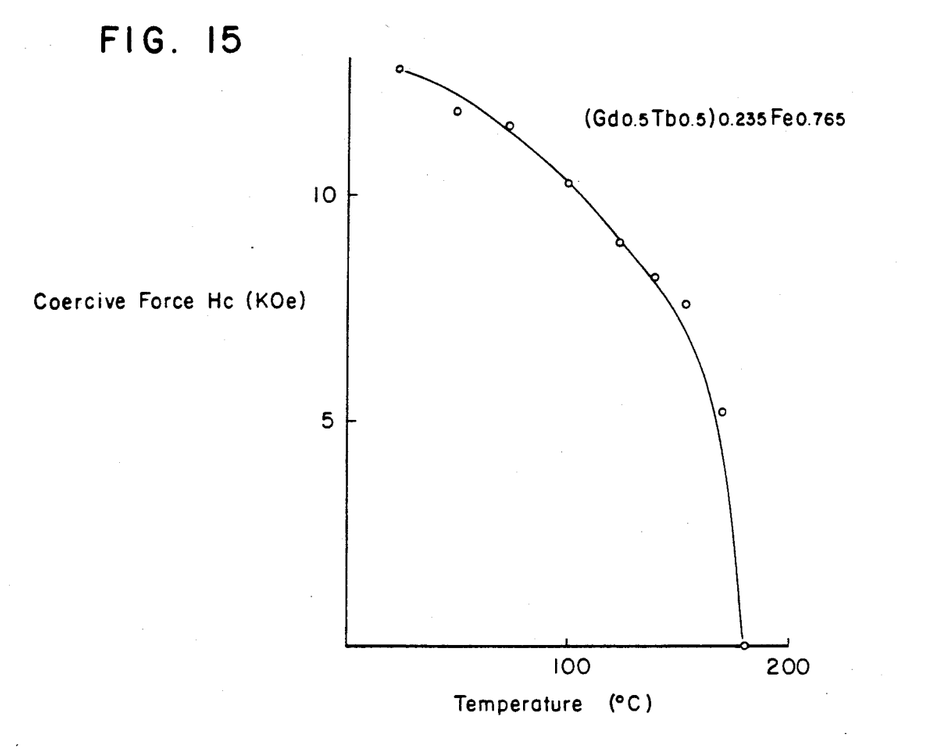

Alternatively, as is clear from FIG. 10, the GdTbFe recording film 4 (hereinafter referred to as "recording film") having a high coercive force of 5 kOe or more can be prepared comparatively easily. Temperature dependence of the coercive force of the recording film 4 varies with its component ratio. As shown in FIG. 12 to 15, the recording film 4 exhibits a high coercive force in any cases, therefore, it is suitable for the recording film. Here, FIG. 12 represents temperature dependence of the coercive force in the case where a component ratio of the recording film is $Gd_{0.5}Tb_{0.5})_{0.145}Fe_{0.855}$. FIG. 13 represents the former in the case where the latter is $(Gd_{0.5}Tb_{0.5})_{0.169}Fe_{0.831}$. FIG. 14 represents the former in the case where the latter is $(Gd_{0.5}Tb_{0.5})_{0.182}Fe_{0.818}$. FIG. 15 represents the former in the case where the latter is $(Gd_{0.05}Tb_{0.5})_{0.235}Fe_{0.765}$.

Figure 16:
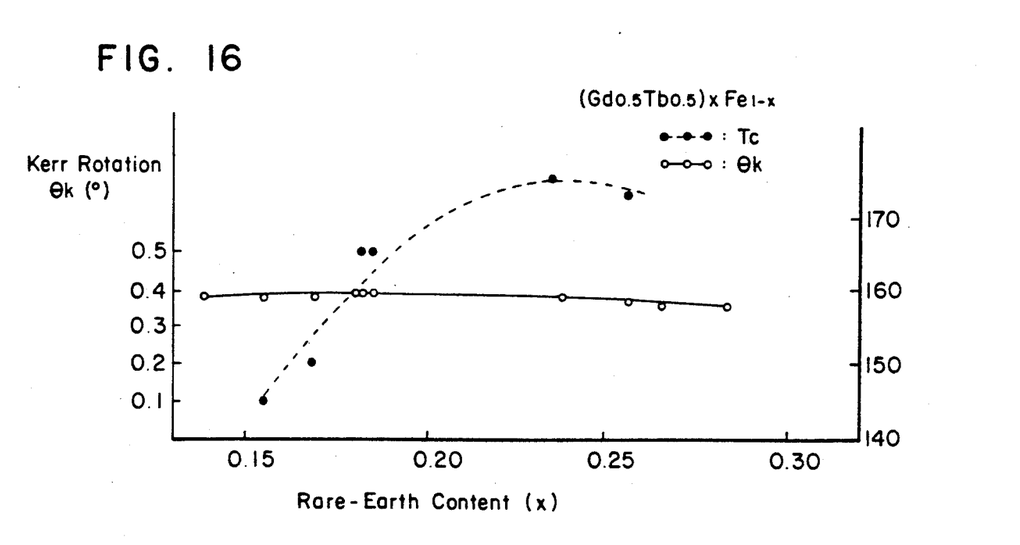
FIG. 16 is a view showing relationship between component ratio of rare earth elements and coercive force, and that between component ratio of rare earth elements and Curie temperature, when a component ratio of Gd is equal to that of Tb in a GdTbFe film.

As shown in FIG. 16, Curie temperature of the recording film exists within a high degree range as high as approximately 150° C. to 170° C., therefore, the recording sensitivity can be improved. Also as shown in FIG. 16, in a comparatively long-wavelength area, the Kerr rotation angle of the recording film is substantially constant: approximately 0.4°. Note that the wavelength of a light source is 780 nm. However, in a short-wavelength area, the Kerr rotation angle is reduced comparatively largely as shown in FIG. 4.

Figure 17:
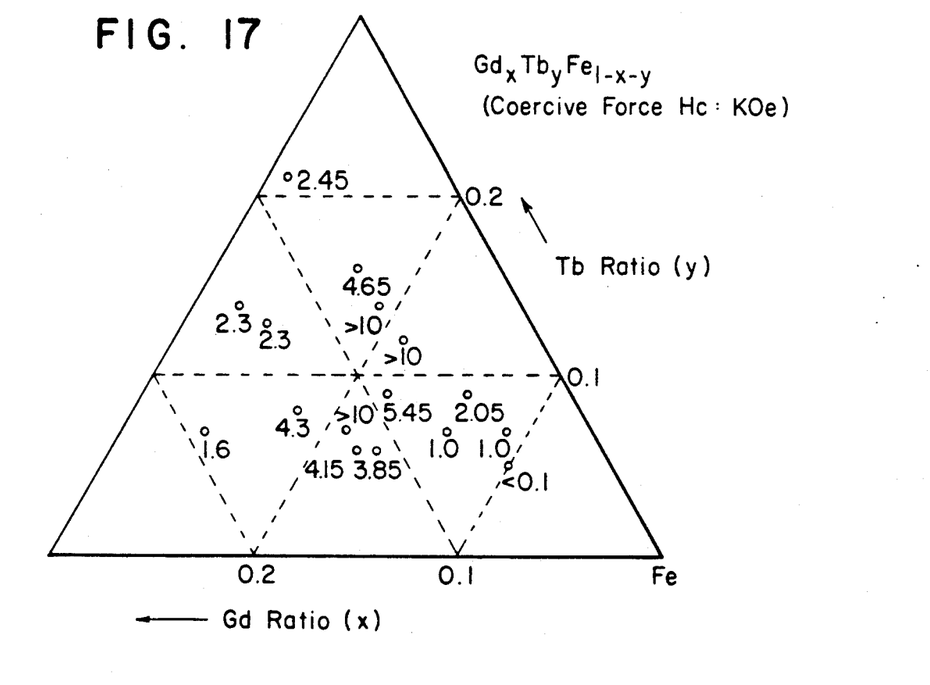
FIG. 17 is a view showing a relationship between component ratio of rare earth elements and coercive force in a GdTbFe film.
Figure 18:
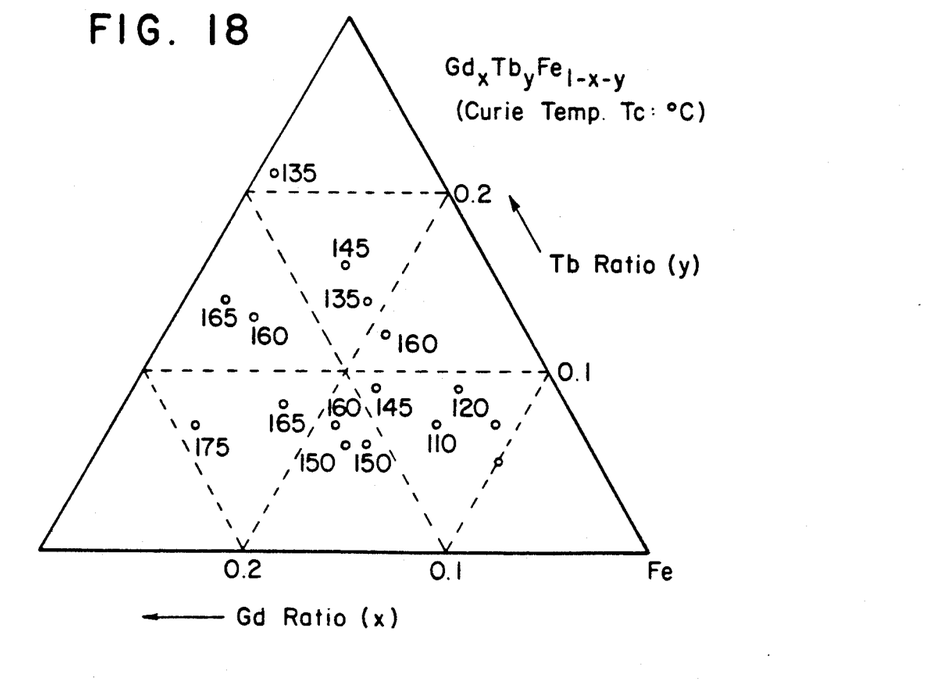
FIG. 18 is a view showing a relationship between component ratio of rare earth elements and Curie temperature in a GdTbFe film.

A component ratio of the recording film 4 is restricted to the range satisfying the following inequalities (4) to (6), based on conditions where the coercive force is more than 1 kOe in view of stability required for small information-written bits; and the Curie temperature range is 100° C. to 200° C. in view of recording sensitivity. In FIG. 17, the values represent coercive forces; >10 represents the case where the coercive force is larger than 10 kOe; and <0.1 represents the case where the coercive force is smaller than 0.1 kOe. In FIG. 18, the values represent Curie temperatures.

$$0.1 < q < 0.35 \qquad (4)$$

$$0 < p \times q < 0.25 \qquad (5)$$

$$0 < (1-p) \times q < 0.25 \qquad (6)$$

wherein p represents the component ratio of Gd; and q represents the component ratio of (GdTb), in $(Gd_pTb_{1-p})_qFe_{1-q}$.

Additionally, the second nitride film 5 which is provided to protect the reading film 3 and the recording film 4 is made of the same material as that of the first nitride film 2. It should be understood that a metal film such as of Al may be used instead of the second nitride film 5.

Owing to the construction of the above embodiment of the magneto-optic memory medium, when a laser beam projected from a semiconductor laser or HeNe laser is converged by optical system (not shown) and is spotted to the medium, the spotted beam reaches the reading film 3 and the recording film 4 through the substrate 1 and the first nitride film 2, while temperature of a beam-spotted portion of the reading film 3 increases. Magnetization of the reading film 3 disappears when the above temperature goes beyond Curie temperature thereof. As the magnetization disappears, the exchange-coupled action of the double-layered film disappears. At this time, if a biasing magnetic field (not shown) or the like is applied for facilitating writing to the recording film 4, a core of reversed magnetic domain whose magnetic-spin orientation is reversed to that of the neighboring area is generated. This magnetic domain is then enlarged to be a cylindrical magnetic domain, resulting in a small bit.

When the application of the laser beam stops, temperature of the portion of which temperature has been raised decreases. And when the temperature decreases to the degree immediately below the Curie temperature of the reading film, the above small bit formed in the recording film is transcribed to the reading film 3 by virtue of the exchange-coupled action.

In reproducing (reading), when a linearly polarized laser beam is applied to the substrate 1, a polarized plane of the reflected light rotates in the direction of the above orientation of the magnetic spin with the help of magneto-optic effects. Then, by using a photodetector combined with an analyzer, variation of the reflected light quantity is detected, so that the recorded information can be reproduced.

A magneto-optic memory medium according to the present invention is not limited to the above construction. Various supplementary films such as a protective film and the like may be provided according to any requirement. For example, a reflective film may be added onto the side of the second nitride film 5 opposite to the laser beam applied side thereof. In this case, both the reading film 3 and the recording film 4, which constitute a double-layered film, must be thin enough to permit the laser beam to transmit therethrough. The reflective film is useful for effectively utilizing the light applied.

As described above, the magneto-optic memory medium according to the present invention is so constructed that the GdTbFe recording film of the specific component ratio and the GdNdFe reading film of the specific component ratio which is formed on the laser-applied side of the GdTbFe recording film constitute the double-layered film, the GdTbFe recording film being strong in coercive force and low in Curie temperature, therefore, excellent in recording capability, the GdNdFe reading film being weak in coercive force, high in Curie temperature, and great in magneto-optic effects, especially in short wavelength region therefore, excellent in reproducing capability.

This construction allows the memory medium to be improved in the recording sensitivity and in the reading capability by enhancing the quantum-mechanical exchange-coupled action. Also, using GdNdFe for the reading film enables to greatly reduce the wavelength dependence of the magneto-optic effects. Thus, it becomes possible to use a laser beam having a short-wavelength, thereby minimizing a laser-beam diameter for a remarkable improvement in recording density, and at the same time improving the S/N ratio particularly in a short-wavelength area when reading. In addition, the above construction enables to use a laser beam regardless of its wavelength, thereby enjoying a wide-ranged selectivity of a light source, and the like.

What is claimed is:

1. A magneto-optic memory medium comprising a laminate of a recording film made of an amorphous rare earth-transition metal alloy having a high coercive force and a reading film made of an amorphous rare earth-transition metal alloy exhibiting magneto-optic effects;

said recording film being made of an amorphous alloy represented by the formula:

$$(Gd_pTb_{1-p})_qFe_{1-q}$$

wherein p and q satisfy the relationships $0.1 < q < 0.35$, $0 < p \times q < 0.25$, and $0 < (1-p) \times q < 0.25$; and said reading film being made of an amorphous alloy represented by the formula:

$$Gd_xNd_yFe_{1-x-y}$$

wherein x and y satisfy the relationships $0.1 < x < 0.3$, and $0 < y < 0.25$.

2. The magneto-optic memory medium of claim 1 in which each of the recording film and the reading film has a thickness of 500 nm or less.

3. The magneto-optic memory medium of claim 1 in which each of the films has a thickness of 10–100 nm.

4. The magneto-optic memory medium of claim 1 in which the reading film is laminated on a first dielectric film which is in turn laminated on a transparent substrate and the recording film is laminated on the reading film.

5. The magneto-optic memory medium of claim 4 in which the recording film is covered with a second dielectric film.

6. The magneto-optic memory medium of claim 4 in which said first dielectric film is selected from the group consisting of SiN, AlN, ZnS, $SiO_2$, SiAlON and AlNGe.

7. The magneto-optic memory medium of claim 5 in which said second dielectric film is selected from the group consisting of SiN, AlN, ZnS, $SiO_2$, SiAlON and AlNGe.

8. The magneto-optic memory medium of claim 6 in which said second dielectric film is selected from the group consisting of SiN, AlN, ZnS, $SiO_2$, SiAlON and AlNGe.

9. The magneto-optic memory medium of claim 8 in which said first and second dielectric films are formed from SiN or AlN.

10. The magneto-optic memory medium of claim 9 in which said first and second dielectric films have a thickness of 80 to 100 nm.

11. The magneto-optic memory medium of claim 8 in which each of the recording film and the reading film has a thickness of 500 nm or less.

12. The magneto-optic memory medium of claim 9 in which each of the recording film and the reading film has a thickness of 500 nm or less.

13. The magneto-optic memory medium of claim 8 in which each of the recording film and the reading film has a thickness of 10–100 nm.

14. The magneto-optic memory medium of claim 9 in which each of the recording film and the reading film has a thickness of 10–100 nm.

* * * * *